(12) United States Patent
    Lavini (10) Patent No.: US 9,919,775 B2
(45) Date of Patent: Mar. 20, 2018

(54) SHIPS FOR NAVIGATING IN ICY WATERS WITH IMPROVED PROPULSIVE PERFORMANCE

(71) Applicant: FINCANTIERI S.P.A., Trieste (IT)

(72) Inventor: Gianpiero Lavini, Trieste (IT)

(73) Assignee: FINCANTIERI S.P.A., Trieste (IT)

( * ) Notice: Subject to any disclaimer, the term of this patent is extended or adjusted under 35 U.S.C. 154(b) by 0 days.

(21) Appl. No.: 15/107,521

(22) PCT Filed: Dec. 24, 2013

(86) PCT No.: PCT/IT2013/000363
§ 371 (c)(1),
(2) Date: Jun. 23, 2016

(87) PCT Pub. No.: WO2015/097720
PCT Pub. Date: Jul. 2, 2015

(65) Prior Publication Data
US 2016/0318586 A1    Nov. 3, 2016

(51) Int. Cl.
*B63B 35/08*     (2006.01)
*B63B 1/32*      (2006.01)

(52) U.S. Cl.
CPC .............. *B63B 35/083* (2013.01); *B63B 1/32* (2013.01); *B63B 35/08* (2013.01); *B63B 2001/325* (2013.01); *Y02T 70/12* (2013.01)

(58) Field of Classification Search
CPC ......... B63B 35/08; B63B 35/083; B63B 1/08; B63B 2001/202; B63B 3/40; B63B 2001/325
See application file for complete search history.

(56) References Cited

U.S. PATENT DOCUMENTS

| 6,038,995 A | 3/2000 | Karafiath et al. |
| 2010/0000455 A1 | 1/2010 | Harper |
| 2010/0000462 A1* | 1/2010 | Morand ................ B63B 39/061 |
| | | 114/284 |

FOREIGN PATENT DOCUMENTS

| DE | 4208682 A1 | 9/1992 |
| RU | 2494911 C1 | 10/2013 |

OTHER PUBLICATIONS

Wartsila, Ship design, improvement to reduce fuel consumption, Energy Efficiency Catalogue / Ship Power R&D, Feb. 3, 2009, XP055139507, Retrieved from the Internet: URL:http://dc359.4shared.com/doc/h3fUxkfH/preview.html [retrieved on Sep. 11, 2014].

* cited by examiner

*Primary Examiner* — Andrew Polay
(74) *Attorney, Agent, or Firm* — Robert E. Alderson, Jr.

(57) ABSTRACT

Ships for navigating in icy waters are provided. Such ships include in the stern area a wedge which extends from bottom of the ship downwards transversely to the ship. The wedge may have a first surface inclined towards the bow and a second surface inclined towards stern with respect to a horizontal plane. These two surfaces can be connected to each other forming a lower edge of wedge. The wedge is at least partially arranged below waterline of the ship. The first inclined surface is dimensioned in such a way that in the case of forward motion, the first surface contacting the flow of water, generates a lift force in order to modify the longitudinal trim of the ship acting as a trim wedge. The second inclined surface also is shaped advantageously in the case of reverse motion in icy waters.

27 Claims, 7 Drawing Sheets

SHIPS FOR NAVIGATING IN ICY WATERS WITH IMPROVED PROPULSIVE PERFORMANCE

CROSS-REFERENCE TO RELATED APPLICATION

This application is a National Phase Application of PCT International Application No. PCT/IT2013/000363, International Filing Date, Dec. 24, 2013 which is hereby incorporated by reference in its entirety.

FIELD OF THE INVENTION

The object of the present invention is a ship for navigating in icy waters with improved propulsive performance.

In particular, the ship according to the invention may be a container ship, a RO-RO, a ferry, a service vessel for mining platforms, a fishing vessels, etc.

BACKGROUND OF THE INVENTION

All modern ships are equipped with a device able to reduce the drag coefficient, called trim wedge. Such a device is applied in the stern area below the transom. Such a device consists of a wedge-shaped appendix that extends across the width of the ship and is substantially defined by a flat vertical surface facing towards stern as a continuation of the transom and by an inclined surface facing towards the bow. When the ship proceeds in the forward direction, the inclined surface is hit by water. A very high lift force is thus generated which changes the trim of the ship, significantly improving the propulsive performance thereof. In order to be effective, a trim wedge should be placed with its lower portion below the waterline.

The trim wedge cannot be used on ships intended to operate in icy sea areas. In navigation in the ice, in the case of reverse motion the vertical flat surface of the trim wedge would impact the ice. The impact area would be very large, given the extension of the trim wedge. While the ship could have a powerful propulsion system, the specific pressure would be very low, and therefore insufficient to cause the fracture of the ice. In addition, the trim wedge would cause a gradual accumulation of ice in the stern area resulting in blockage of the ship in the reverse motion.

Due to these constraints, the ships used for navigation in icy waters, even if only for some periods of the year, are never equipped with stern trim wedge. In particular, the adoption of the trim wedge would make manoeuvres in icy port areas considerably difficult, if not impossible, the reverse motion being in fact prevented.

Therefore, in the ships intended for navigation in icy waters, the need to ensure adequate manoeuvrability has led to sacrifice the propulsive performance in open water, giving up the trim wedge.

A need deeply felt in the field of ships used for navigation in icy waters therefore is to improve the propulsive performance in open water, without renouncing to an adequate manoeuvrability in icy waters.

SUMMARY OF THE INVENTION

Therefore, the object of the present invention is to eliminate or at least mitigate the drawbacks of the prior art cited above by providing a ship for navigating in icy waters, which offers higher propulsive performance without losing manoeuvrability in the reverse motion in icy waters, indeed increasing the manoeuvrability thereof.

A further object of the present invention is to provide a ship for navigating in icy waters, which is operationally reliable.

A further object of the present invention is to provide a ship for navigating in icy waters, which ensures the above advantages without being considerably more expensive than similar traditional ships.

The technical features of embodiments of the invention and the advantages of the same will appear more clearly from the following detailed description with reference to the attached drawings briefly described below.

DETAILED DESCRIPTION

With reference to the accompanying drawings, reference numeral 1 globally indicates a ship for navigating in icy waters according to the invention.

Herein and in the following description, reference will be made to ship 1 in usage condition. Therefore, references to a lower or upper position, or to a horizontal or vertical direction, shall be understood in this meaning.

According to a general embodiment of the invention, ship 1 is provided in the stern area 3 with a wedge 10 which extends from bottom 4 of the ship downwards transversely to the ship.

According to an essential aspect of the present invention, wedge 10 is defined by a first surface 11 inclined towards the bow and by a second surface 12 inclined towards stern with respect to a horizontal plane.

These two surfaces 11, 12 are connected to each other forming a lower edge 10' of wedge 10.

According to another essential aspect of the present invention, wedge 11 is at least partially arranged below waterline WL of the ship.

The first inclined surface 11 is dimensioned in such a way that in the case of forward motion, the first surface 11, hit by the flow of water, generates a lift force such as to modify the longitudinal trim of the ship working with a traditional trim wedge.

The second inclined surface 12 is dimensioned in such a way that, in the case of reverse motion in icy waters, it engages the ice first and for the ship serves as a rising chute above the ice itself. Operationally, once the stern of the ship has been made to slide over the ice by its propulsive thrust, thanks to the weight of the ship itself, wedge 10 breaks the ice by bending, opening the way to the ship.

Figure 3:
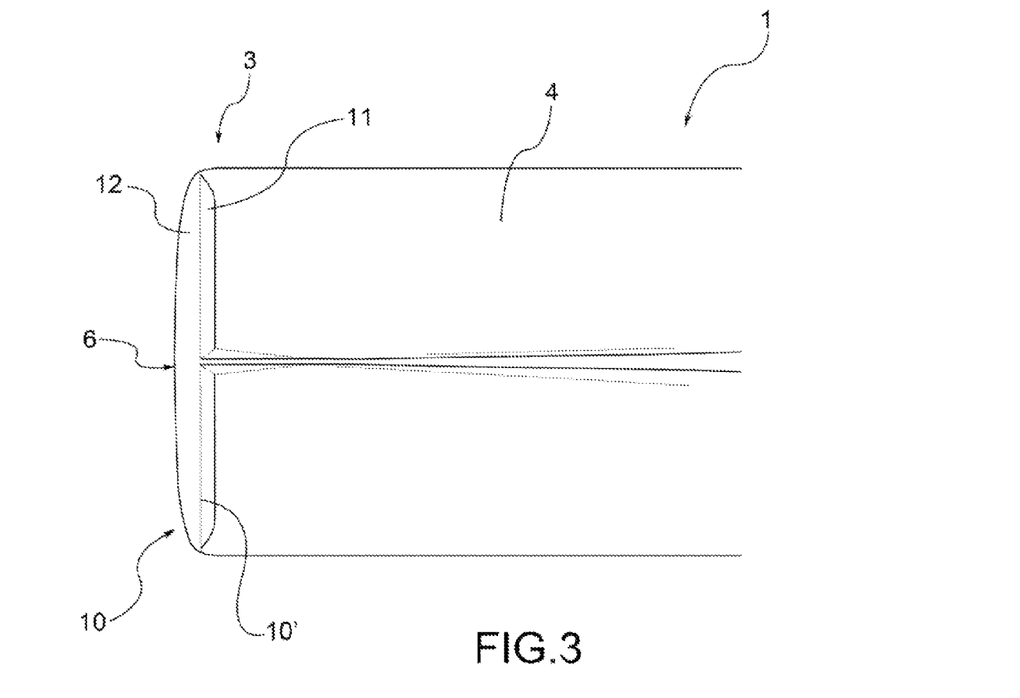
FIG. 3 shows a bottom view of the detail of the stern area shown in FIG. 2.
Figure 4:
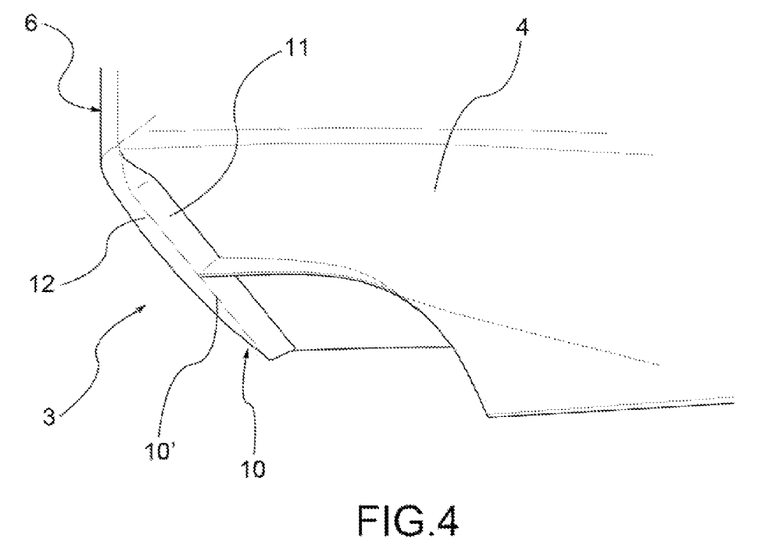
FIG. 4 shows a perspective bottom view of the detail of the stern area shown in FIG. 2.
Figure 5:
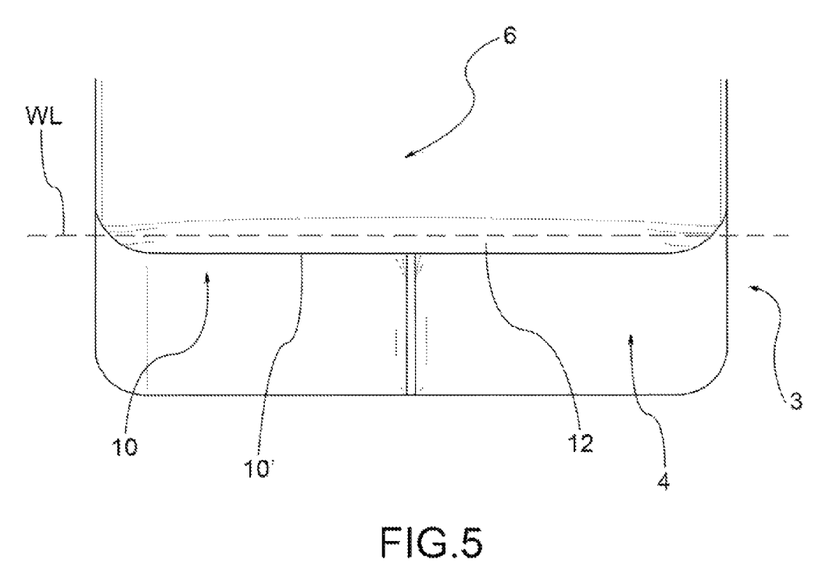
FIG. 5 shows a rear front view of the detail of the stern area shown in FIG. 2.
Figure 7:
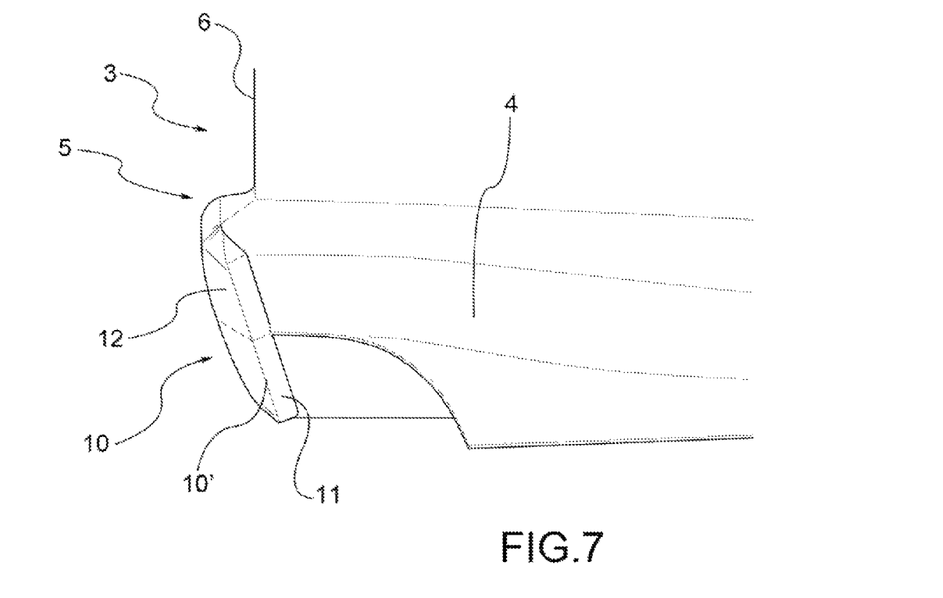
FIG. 7 shows a perspective bottom view of the detail of the stern area shown in FIG. 6.

Preferably, as shown in FIGS. 3, 5 and 7, wedge 10 extends transversely to the ship from side to side.

Advantageously, as shown in the accompanying Figures, the first inclined surface 11 is connected to bottom 4 of the ship.

Preferably, said first surface 12 is flat. However, other shapes functional to the purpose of such a first surface 12—i.e. acting as a trim wedge in the forward motion of the ship—may also be provided.

Advantageously, said first surface 11 forms a first angle α with a horizontal plane between 35° and 45°. Preferably, said first angle α is approximately equal to 40°, this being the value that experimentally gave the best average performance.

Advantageously, as shown in the accompanying figures, said second surface 12 extends towards the stern above waterline WL of the ship in order to also engage the ice emerged and prevent transom 6 of the ship from impacting against the ice.

The extension of the above surface 12 over waterline WL depends on the size of the ship and on the thickness of ice that the ship must be able to deal with, including the emerged one. Preferably, the second surface 12 extends towards the stern above waterline WL of the ship with a vertical extension E of 500-600 mm. Such an extension allows the second surface 12 to engage formations of ice accumulated by the wind (called "ridge ice") having emerging portions even up to 0.5 m in height (thus with submerged parts of 5 meters).

Preferably, the above wedge 10 (and in particular the second inclined surface 12) is arranged in the extreme stern area, below transom 6. This arrangement, in particular when combined with the extension of the second inclined surface 12 above the waterline, ensures that in the reverse motion the second inclined surface is the first part of the ship to engage the ice and not the transom.

Figure 1:
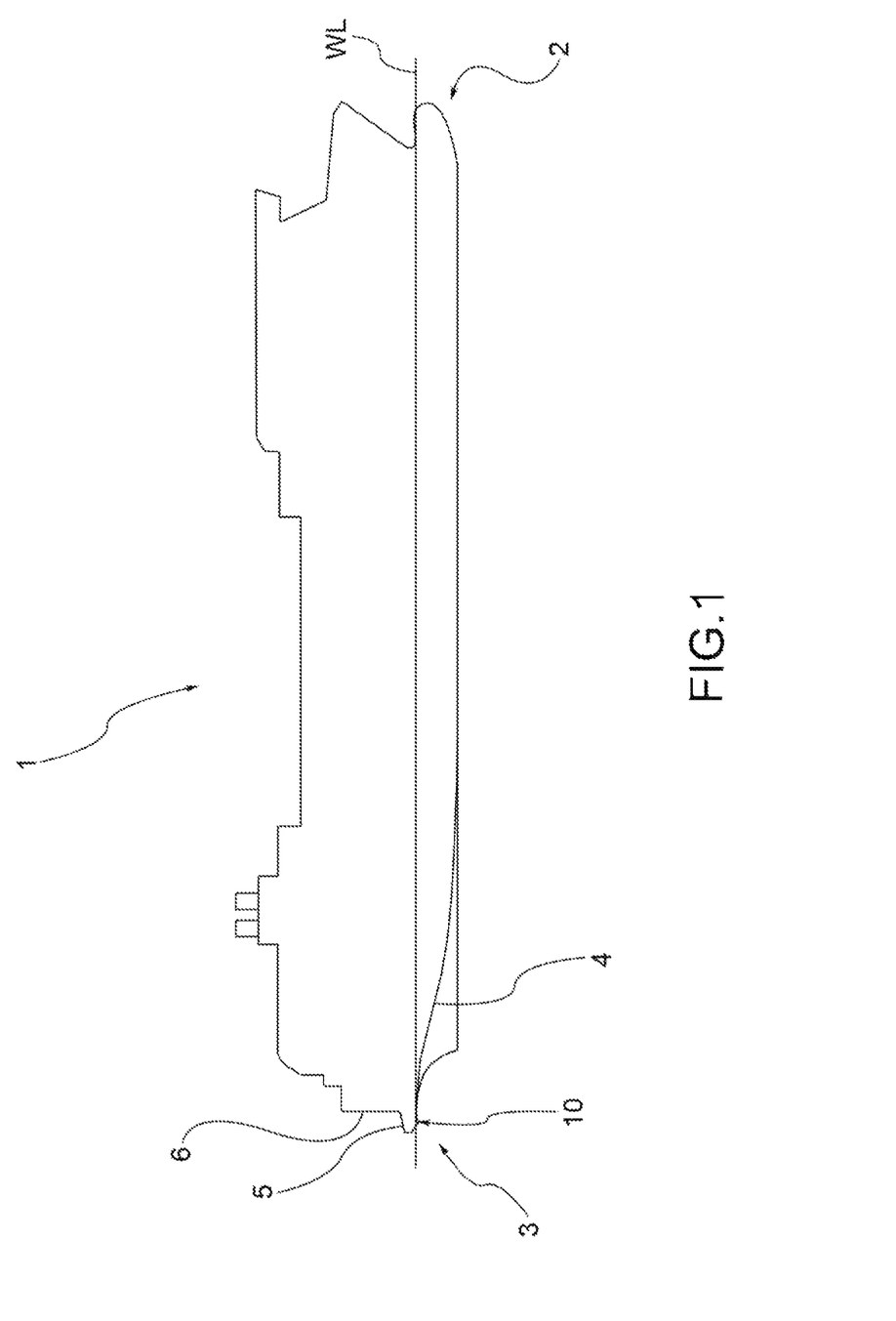
FIG. 1 shows a schematic side view of a ship according to a first embodiment of the present invention.
Figure 2:
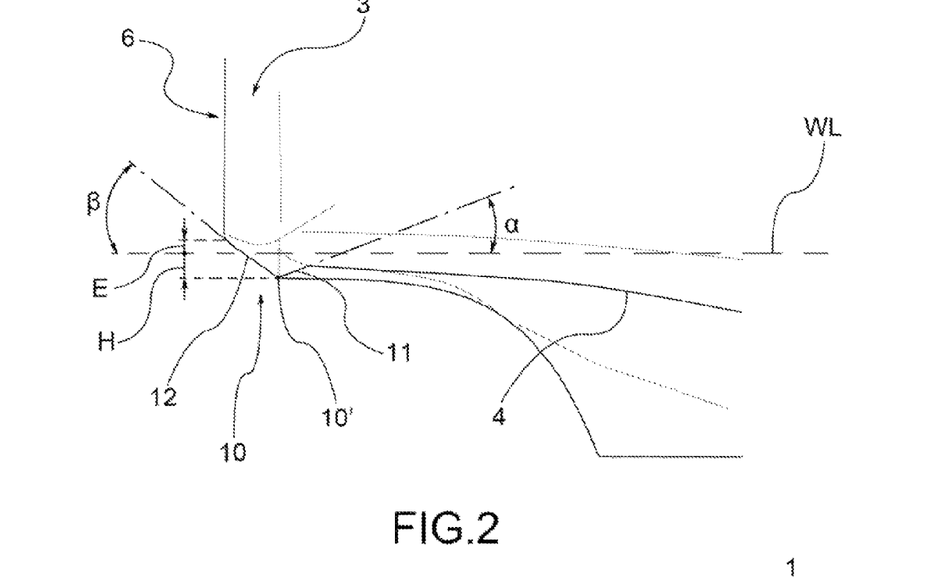
FIG. 2 shows a side view of a detail of the stern area of a ship according to a second embodiment of the present invention.

Preferably, as shown in particular in FIGS. 2 and 5, the second inclined surface 12 is connected to transom 6 of the ship.

Advantageously, again in order to prevent transom 6 of the ship from engaging the ice before the second inclined surface 12, the second inclined surface 12 is dimensioned so as to extend longitudinally up to the transom to connect thereto, preventing the transom from protruding longitudinally beyond it.

Preferably, said second surface 12 is flat. However, other shapes may be provided, as long as they are functional in order to make the second inclined surface 12 slide on the ice and thereby make the ship stern go over the ice itself.

Advantageously, said second surface 11 forms a second angle β with a horizontal plane between 35° and 45°. Preferably, such a second angle β is equal to 38°.

According to a preferred embodiment, shown in the accompanying Figures, the first and the second inclined surface 11 and 12 form equal angles with a horizontal plane, preferably of 38°. Both inclined surfaces 11 and 12 are flat. Wedge 10 has a triangular section, in particular shaped as a right triangle, with a right angle at edge 10'.

According to the preferred embodiment, shown in the accompanying Figures, the second surface 12 is specular to the first surface 11 with respect to a vertical axis passing by edge 10'.

Advantageously, height H of wedge 10, calculated as the vertical distance between edge 10' and wedge base (the base being defined by the bottom of the ship where the first surface 11 is connected) is selected as a function of the thickness of the ice to be crushed and of the dimensions. Height H of the wedge also defines the extension of the first surface 11. Height H is thus selected also so as to ensure a good hydrodynamic behaviour in ice free water.

Figure 8:
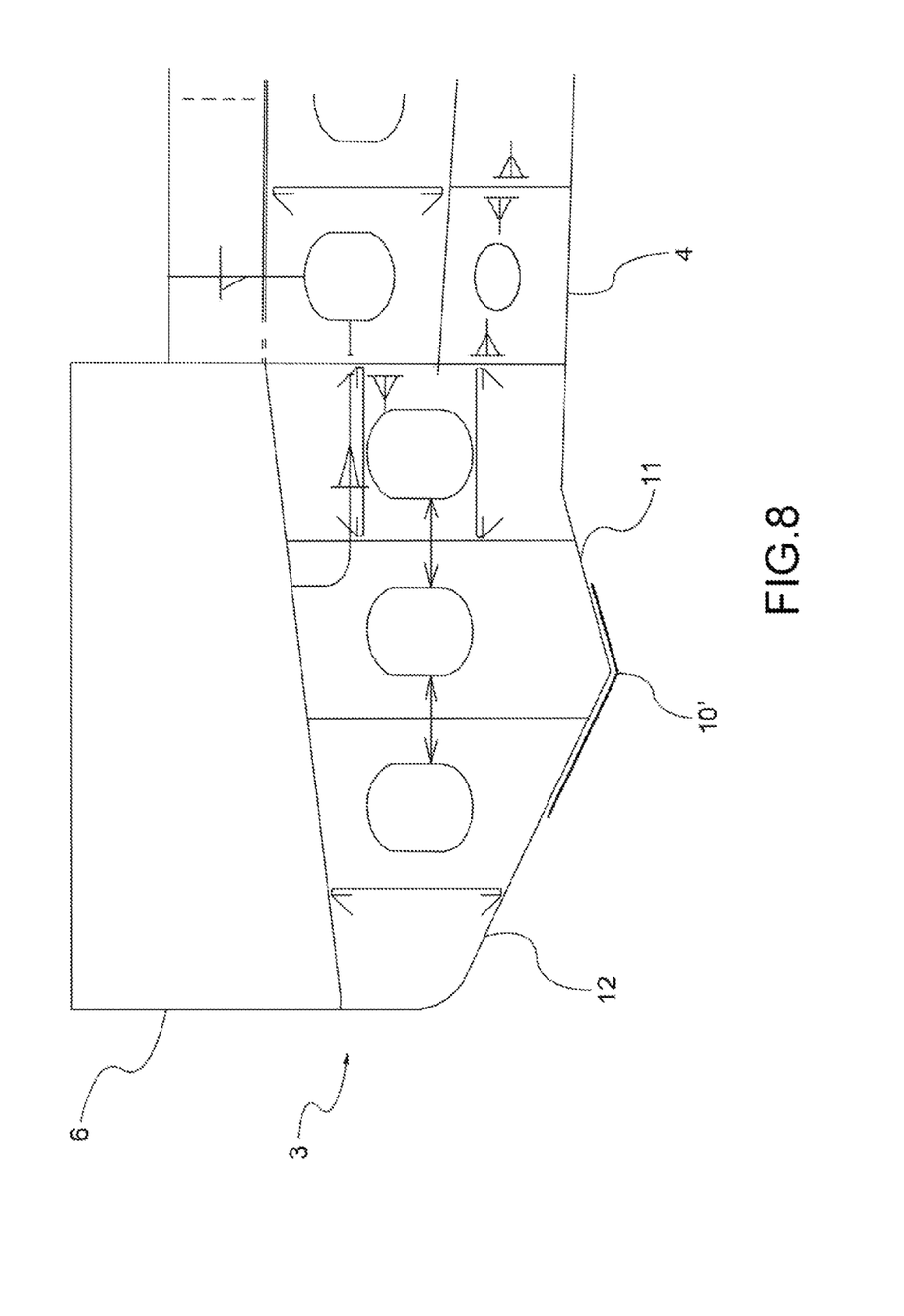
FIG. 8 shows a longitudinal section of a portion of the stern area shown in FIG. 2 at the scantling plan.
Figure 9:
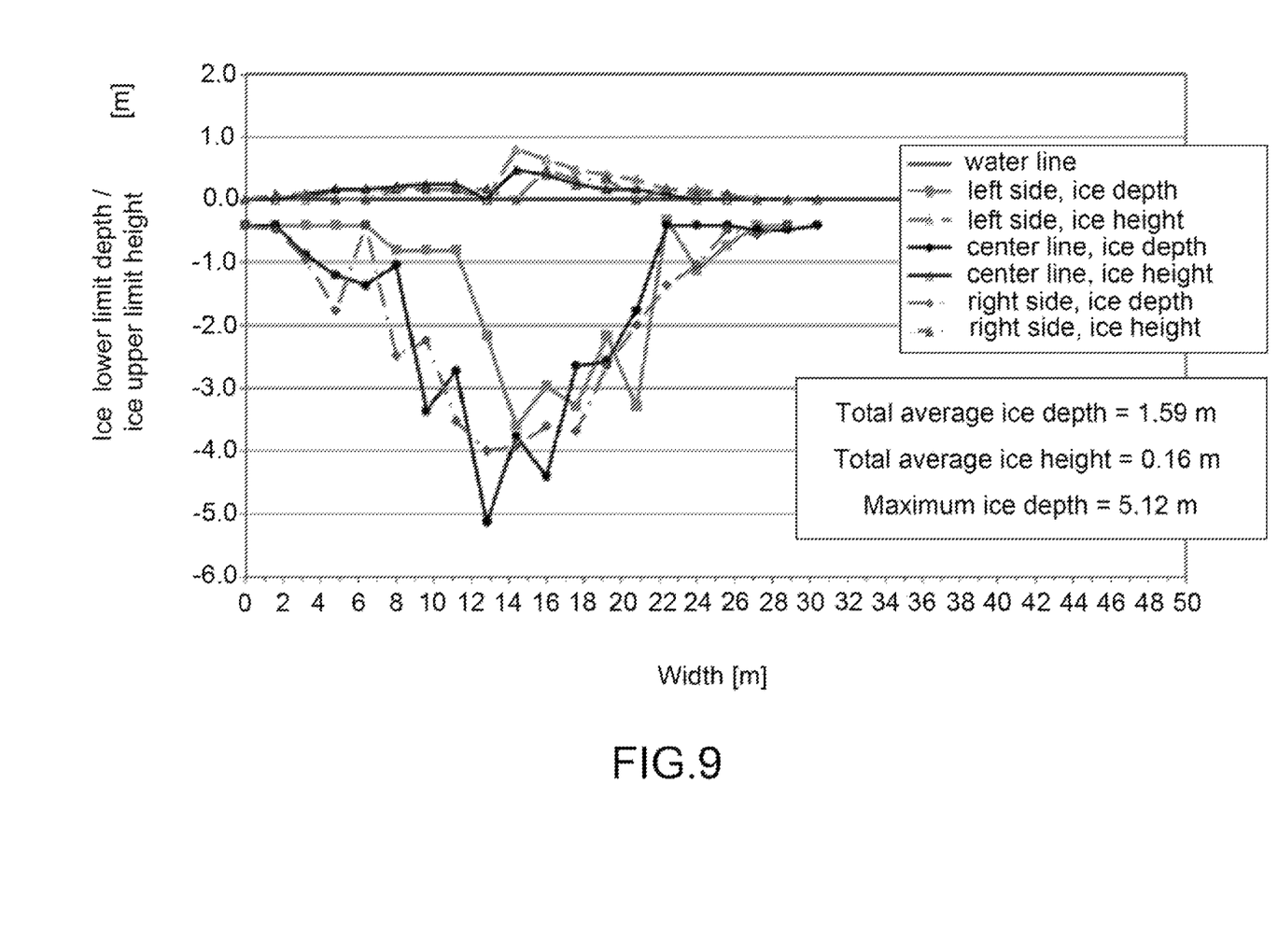
FIG. 9 shows a graph of the crushing capacity of ridge ice by a test ship according to the present invention.

According to the embodiment shown in FIGS. 2 to 5 and in FIG. 8, wedge 10 is incorporated into the stern structure 4 of hull 4 without protruding therefrom in the longitudinal direction.

Figure 6:
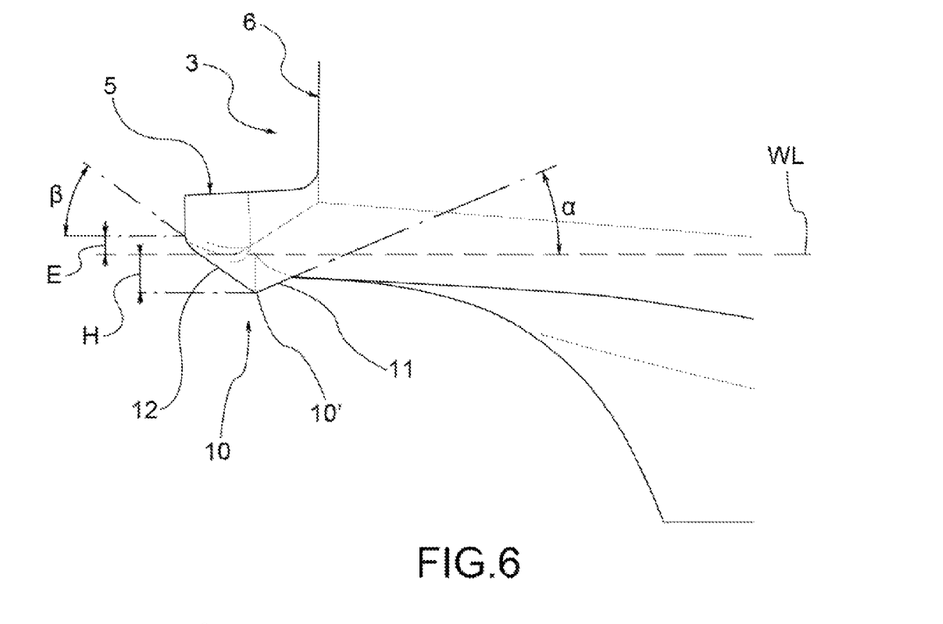
FIG. 6 shows a side view of a detail of the stern area of the ship shown in FIG. 1.

According to the embodiment shown in FIGS. 6 and 7, wedge 10 may be positioned in a stern protuberance 5 protruding longitudinally with respect to transom 6, i.e. at a cantilever structure. In particular, such a stern protuberance 5 is provided in the gangway area, for example in ferries, and is called "duck tail" in jargon. A solution which provides for the combination of wedge 10 with the duck tail does not only ensure an improvement in the propulsion, but also greater protection in the gangway area from impacts with ice.

The operational functioning of wedge 10 in terms of crushing of the ice is the same with or without the duck tail.

Advantageously, wedge 10 is made with thick sheets suitably dimensioned for impacts with the ice both in the solution completely incorporated in the hull, and in the solution with duck tail. Wedge 10 is internally provided with longitudinal reinforcing structures. Figure schematically shows a longitudinal section of the scantling plan of an exemplary embodiment.

The stern wedge 10 according to the present invention—in contrast to a normal trim wedge—does not allow the ship to block in the ice, but on the contrary is instead an effective device for crushing the icy surface active in reverse motion.

As already mentioned above, the breaking of the ice is carried out by crushing with downward bending. In reverse motion, wedge 10 (and in particular the second inclined surface 12) allows the ship to surmount the icy packs. The second inclined surface 12 allows the ship not to collide with the ice, but instead to gradually rise above the icy pack. Once the icy surface has been surmounted, thanks to the wedge shape the edge breaks the ice by using the compression generated by the weight of the ship.

Figure 10:
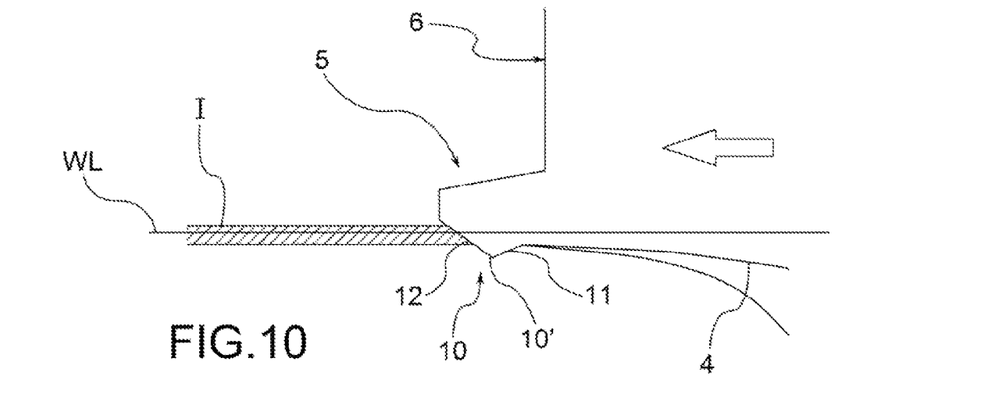
FIGS. 10 to 12 show the sequence of advancement in icy waters in reverse motion of a ship according to the present invention.
Figure 11:
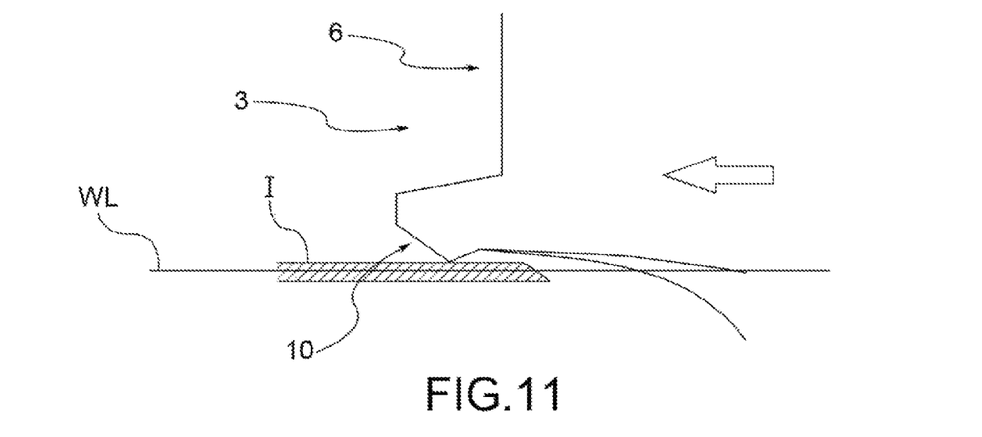
Figure 12:
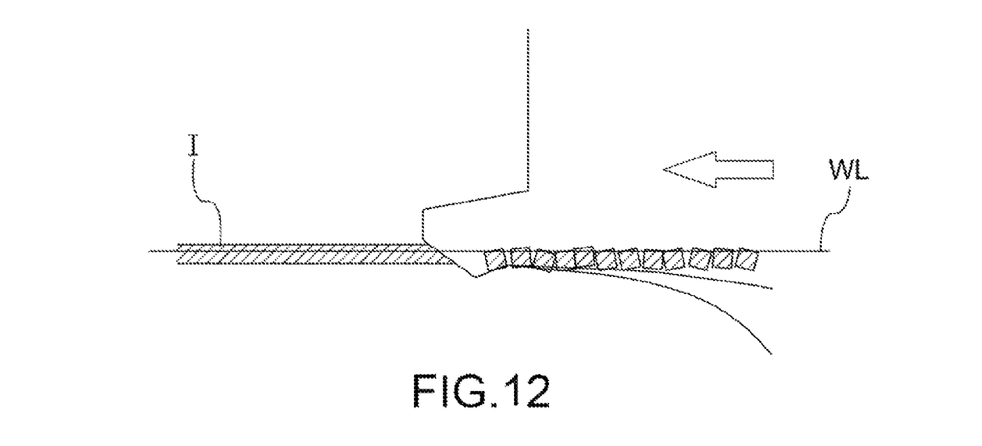

The ice crushing sequence is shown in FIGS. 10, 11 and 12 (where the layer of ice—depicted schematically—has been indicated with I):

contact with the ice at the second inclined surface (FIG. 10);

ice surmounting (FIG. 11); and fracture due to bending of the icy surface (FIG. 12).

Advantageously, the crushing in reverse motion occurs in a continuous manner without the need for alternating battering ram motions forward to release from the block and then accelerating in reverse motion. The mode of breakage with battering ram is that adopted by traditional ships in reverse motion in the ice.

The possibility to crush the ice with a continuous motion favours manoeuvres in icy areas both in terms of reduction of time, but also of fluidity and precision (the latter aspect is important in case of manoeuvring in port waters).

The mode of crushing by ice surmounting allowed by the presence of the stern wedge according to the invention further prevents the ship from remaining blocked in the ice similarly to what happens with icebreaker. Thanks to the present invention, in fact, the fracture of the ice always occurs by bending and not by impact. The invention allows the more effective breaking method to be adopted. In fact, it is well-known that ice has a very high compression resistance, while it is very fragile to bending.

The present invention with the stern wedge 10 thus uses the same breaking methodology used by icebreakers as it does not break the surface through a successive series of impacts, but using the weight itself of the ship which by surmounting the ice subjects the layer of ice to bending.

Experimental tests carried out in an ice tank on a ship according to the invention (i.e., provided with the stern wedge 10) showed an excellent capacity to break the level ice with thicknesses of more than 0.5 meters. The level ice is the type of ice which is more resistant, compact, never broken before and without fracture lines.

The test ship was further able to effectively break down ice ridge barriers of about 7 meters thickness without having to resort to alternating forward and reverse motions. The ice ridge is a type of ice accumulated by the wind and sea currents, not coherent, nor compact which forms accumulations below the water surface which are up to 5 meters deep and more.

Thanks to the invention, the ship therefore behaves in reverse motion as an icebreaker. Therefore, even in very thick ice conditions, the ship is able to manoeuvre without risking of being blocked.

Below are the results of the experimental tests carried out on an ice tank with a test ship provided with the stern wedge according to the present invention. Table 1 below shows the main features of the ship used in the tests.

TABLE 1

| Length between perpendiculars | 120 m |
| Width | 22.4 m |
| Immersion | 5.5 m |
| Displacement | 9800 t |
| Installed power | 14000 kW. |

The above test ship had a stern wedge having a height H at the edge equal to 500 mm and extending transversely from side to side. The two inclined surfaces 11 and 12 were flat and each formed an angle of 38° with a horizontal plane. The second surface 12 extended towards the stern above waterline WL of the ship with a vertical extension E equal to 500 mm. Tables 2 and 3 show the power values required in reverse motion for the above test ship in conditions of level ice and ridge ice, respectively.

TABLE 2

| Average level ice height [m] | Ice bending resistance [kPa] | Average speed [knots] | Average thrust [kN] | Power [MW] |
| --- | --- | --- | --- | --- |
| 0.5 | 765 | 1.3 | 266.48 | 4.5 |

TABLE 3

| Average ridge ice thickness [m] | Ridge ice width [kPa] | Attempts [—] | Average speed [konts] | Average thrust [kN] | Power [MW] |
| --- | --- | --- | --- | --- | --- |
| 1.75 | 24 | 1 | 5.3 | 1128 | 11.7 |

The test results shown in tables 2 and 3 demonstrate the ability of the ship to move continuously at the speed of one knot in reverse motion with a level ice (the hardest and most difficult to break) of 0.5 meters and with a ridge ice having an average height of 1.75 and maximum height of 7 meters. These values are significantly high. The tests in ice ridge demonstrate that the breaking with the stern wedge according to the invention is always carried with a single stroke (only one attempt) and thus without the need to resort to more impacts. This demonstrates that with the stern wedge according to the invention the ship has a continuous motion in breaking the ice pack. As already said, this is a great advantage in the manoeuvring operations.

The graphs in FIG. 8 show, at various distances from the edge of the ice tank, the thickness value of the ridge ice above and below the ice surface at various abscissas along the advance direction of the ship in the experimental tests the results of which are shown above.

The invention allows several advantages to be obtained, some of which have already been noted above.

The ship for navigating in icy waters according to the invention, thanks to the presence of the stern wedge, combines superior propulsive performance in open water (due to the presence of the first inclined surface which acts as a trim wedge) with a very good manoeuvrability in icy waters. The invention therefore allows the use of the trim wedge not only without losing manoeuvrability in the reverse motion, but rather increasing the manoeuvrability.

The stern wedge according to the invention is an ice breaking device to be used in reverse motion in order to improve the manoeuvring performance in seawaters covered by ice packs. The performance of the breaking device according to the invention allow the classification of the ship equipped with it up to ice class 1AS, i.e. the highest class of the Finnish Swedish Maritime Administration for ships that are not icebreakers.

The invention therefore is an optimal solution for navigation both in open water and in icy waters, which allows the ships equipped with it to operate in complete safety and with low power consumption in all seasonal icy areas even with ice of considerable thickness without the risk of remaining blocked waiting for help from the icebreakers. Areas with perennial pack out of trade routes are excluded.

Below are the main advantages associated with the present invention:
  increase in the operational supply: the invention allows units carrying out winter service in the ice to operate up to very high thicknesses of "level ice" and "ridge ice" without the icebreaker support;
  no penalty in terms of navigation in ice free waters: during summer navigation, there is no propulsive penalty compared to a ship not built for the Arctic service;
  energy saving: the invention allows the use of the trim wedge and thus substantially reducing the exhaust emissions in summer;
  increased safety: the invention provides an added value for ships operating in areas bordering the Arctic seas as its application prevents the phenomenon of blocking in the ice;

general use: the invention is an optimal solution for all types of ships with double operating profile, summer-winter in the ice, like passenger ships to navigate the Antarctic, Baltic ferries and all ships that run Arctic routes to access oil and gas extraction sites.

The ship according to the invention therefore is operationally reliable.

The stern wedge according to the invention does not require complicated construction solutions. The ship according to the invention therefore ensures all the advantages listed above but without being significantly more expensive than similar conventional ships.

The invention thus conceived thus achieves the intended purposes.

Of course, in the practical embodiment thereof, it may take shapes and configurations differing from that illustrated above without departing from the present scope of protection.

Moreover, all the parts may be replaced by technically equivalent ones and the sizes, shapes and materials used may be whatever according to the requirements.

The invention claimed is:

1. A ship for navigating in icy waters comprising a stern area which comprises a wedge which extends from the bottom of the ship downwards, transversely to the ship, wherein said wedge is defined by a first surface inclined towards the bow and by a second surface inclined towards the stern with respect to a horizontal plane, said two surfaces connecting each other at a lower edge of the wedge and wherein said wedge is at least partly arranged below a waterline of the ship, the first inclined surface being dimensioned in such a way that in case of forward motion, the first surface, hit by the water flow, generates a lift force such as to change the trim of the ship acting as a trim wedge, the second inclined surface being dimensioned in such a way that in case of reverse motion in icy waters, the second inclined surface engages the ice first allowing the stern of the ship to slide above the surface of the ice allowing said wedge to crush ice beneath the stern due to the weight of the ship by bending.

2. The ship of claim 1, wherein the wedge extends transversely to the ship from side to side.

3. The ship of claim 1, wherein said first surface is connected to the bottom of the ship.

4. The ship of claim 1, wherein said first surface is flat.

5. The ship of claim 1, wherein said first surface forms a first angle ($\alpha$) with a horizontal plane between 35° and 45°.

6. The ship of claim 5, wherein said first angle ($\alpha$) is equal to 38°.

7. The ship of claim 1, wherein said second surface extends towards the stern above the waterline in order to also engage the ice emerged and prevent the transom of the ship from impacting against the ice.

8. The ship of claim 7, wherein said second surface extends towards the stern above the waterline with a vertical extension (E) with respect to the waterline of the ship of about 500-600 mm.

9. The ship of claim 1, wherein said second surface is connected to the transom of the ship.

10. The ship of claim 1, wherein said second surface is flat.

11. The ship of claim 1, wherein said second surface forms a second angle ($\beta$) with a horizontal plane between 35° and 45°.

12. The ship of claim 11, wherein said first angle ($\alpha$) is equal to said second angle ($\beta$), and is preferably equal to 38°.

13. The ship of claim 1, wherein said wedge is incorporated into the stern structure of the hull without protruding therefrom in the longitudinal direction.

14. The ship of claim 1, wherein said wedge is positioned in a stern protuberance protruding longitudinally with respect to the transom.

15. A ship for navigating in icy waters comprising a stern area which comprises a wedge which extends from the bottom of the ship downwards, transversely to the ship, wherein said wedge is defined by a first surface inclined towards the bow and by a second surface inclined towards the stern with respect to a horizontal plane, said two surfaces connecting each other at a lower edge of the wedge and wherein said wedge is at least partly arranged below a waterline of the ship, the first inclined surface being dimensioned in such a way that in case of forward motion, the first surface, hit by the water flow, generates a lift force such as to change the trim of the ship acting as a trim wedge, the second inclined surface being dimensioned in such a way that in case of reverse motion in icy waters, the second inclined surface engages the ice first allowing the stern of the ship to slide above the surface of the ice allowing said wedge to crush ice beneath the stern due to the weight of the ship by bending, wherein said second surface extends towards the stern above the waterline in order to also engage the ice emerged and prevent the transom of the ship from impacting against the ice.

16. The ship of claim 15, wherein the wedge extends transversely to the ship from side to side.

17. The ship of claim 15, wherein said first surface is connected to the bottom of the ship.

18. The ship of claim 15, wherein said first surface is flat.

19. The ship of claim 15, wherein said first surface forms a first angle ($\alpha$) with a horizontal plane between 35° and 45°.

20. The ship of claim 19, wherein said first angle ($\alpha$) is equal to 38°.

21. The ship of claim 15, wherein said second surface extends towards the stern above the waterline with a vertical extension (E) with respect to the waterline of the ship of about 500-600 mm.

22. The ship of claim 15, wherein said second surface is connected to the transom of the ship.

23. The ship of claim 15, wherein said second surface is flat.

24. The ship of claim 15, wherein said second surface forms a second angle ($\beta$) with a horizontal plane between 35° and 45°.

25. The ship of claim 24, wherein said first angle ($\alpha$) is equal to said second angle ($\beta$), and is preferably equal to 38°.

26. The ship of claim 15, wherein said wedge is incorporated into the stern structure of the hull without protruding therefrom in the longitudinal direction.

27. The ship of claim 15, wherein said wedge is positioned in a stern protuberance protruding longitudinally with respect to the transom.

* * * * *